United States Patent Office 3,819,617
Patented June 25, 1974

3,819,617
PYRAZOLYL-PHENYLALKYLAMINO-KETONES
Walter von Bebenburg, Frankfurt, and Klaus Posselt, Bergen-Enkheim, Germany, assignors to Deutsche Gold- und Silber-Scheideanstalt vormals Roessler, Frankfurt, Germany
No Drawing. Filed Oct. 18, 1971, Ser. No. 190,377
Claims priority, application Austria, July 8, 1971, A 5,967/71
Int. Cl. C07d 49/18
U.S. Cl. 260—240 K                                11 Claims

ABSTRACT OF THE DISCLOSURE

Compounds are prepared having the formula

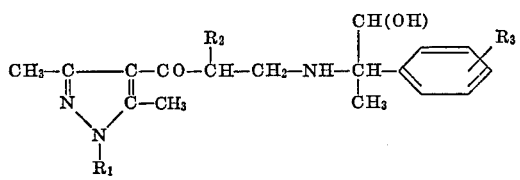

wherein $R_1$ is benzyl, benzyl with 1 to 2 halogen atoms attached thereto, benzyl with 1 or 2 lower alkyl groups, alkenyl or alkinyl with 2 to 6 carbon atoms, phenyl substituted alkenyl or alkinyl with up to 6 carbon atoms in the alkenyl or alkinyl group or when $R_3$ is alkyl, methyl, $R_2$ is hydrogen, methyl or ethyl, and $R_3$ is hydrogen, halogen lower alkyl or lower alkoxy and their salts. They have antiphlogistic activity and also are useful in heart circulatory illnesses.

---

The present invention is concerned with the preparation of new pyrazolyl compounds having the general formula

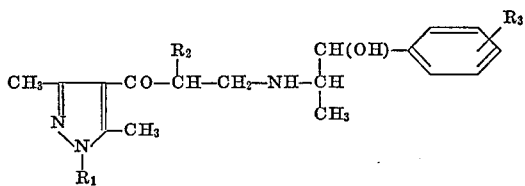

I where $R_1$ is benzyl, benzyl having 1 or 2 halogen atoms and/or lower alkyl groups attached thereto, straight or branched chain alkenyl or alkinyl with 2 to 6 carbon atoms and up to 1 phenyl substituent and with the proviso that when $R_3$ is alkyl $R_1$ can be methyl, $R_2$ is hydrogen, methyl or ethyl and $R_3$ is hydrogen, halogen, lower alkyl or lower alkoxy and their salts, especially their pharmacologically acceptable salts.

The compounds of the invention have effective antiphlogistic activity and partially also possess an heart circulatory activity.

The compounds in the form of their salts can also be used to cure melamine-formaldehyde resins.

By the term lower alkyl and lower alkoxy there are especially included groups having 1 to 6 carbon atoms and by the term halogen especially chlorine and fluorine. Especially good activity is possessed by compounds in which $R_1$ is a halogen substituted benzyl or an alkenyl or alkinyl group with 2 to 4 carbon atoms or phenyl substituted alkenyl or alkinyl, especially with 2 to 4 carbon atoms in the alkenyl or alkinyl group, or is methyl, $R_2$ is hydrogen and $R_3$ is lower alkyl, especially methyl, or hydrogen.

Examples of compounds of formula I within the invention in addition to those set forth in the working examples below are d,1-4-{-[1-phenyl-1-hydroxypropyl-(2)-amino]-propionyl}-1-(4-bromobenzyl)-3,5-dimethyl pyrazole,
1-4-{3-[1-phenyl-1-hydroxypropyl-(2)-amino]-propionyl}-1-(2-methyl-6-hexyl-benzyl)-3,5-dimethyl pyrazole,
1-4-{3-[1-(2-methylphenyl)-1-hydroxypropyl-(2)-amino]-propionyl}-1-(2,4-difluorobenzyl)-3,5-dimethyl pyrazole,
1-4-{3-[1-(4-methoxyphenyl)-1-hydroxypropyl-(2)-amino]-propionyl}-1-allyl-3,5-dimethyl pyrazole,
d,1-4-{3-[1-(4-chlorophenyl)-1-hydroxypropyl-(2)-amino]-propionyl}-1-ethinyl-3,5-dimethyl pyrazole,
d,1-4-{3-[1-(4-fluorophenyl)-1-hydroxypropyl-(2)-amino]-propionyl}-1-vinyl-3,5-dimethyl pyrazole,
1-4-{3-[1-phenyl-1-hydroxypropyl-2-amino]-propionyl}-1-[hexein-(2)-yl-(6)]-3,5-dimethylpyrazole,
d,1-4-{3-[1-phenyl-1-hydroxypropyl-(2)-amino]-propionyl}-1-propallyl-3,5-dimethyl pyrazole,
1-4-{3-[1-phenyl-1-hydroxypropyl-(2)-amino]-2-methylpropionyl}-1(4)-chlorobenzyl)-3,5-dimethyl pyrazole,
d,1-4-{3-[1-phenyl-1-hydroxypropyl-(2)-amino]-2-ethylpropionyl}-1-allyl-3,5-dimethyl pyrazole.

The compounds of the invention can be prepared for example by reacting a compound of the general formula

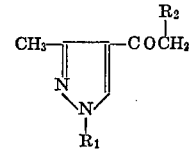

II with a compound of the formula

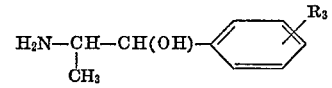

III in the presence of formaldehyde or a formaldehyde liberating material and in a given case converting the compounds to their acid addition salts.

The process can be carried out in conventional manner at a temperature between 20 and 150° C. As formaldehyde liberating materials there can be used for example paraformaldehyde or trioxane. As solvents there can be used for example alcohols, e.g. methyl alcohol, ethyl alcoho, propyl alcohol, isopropyl alcohol and butyl alcohol, dioxane, ethyl acetate, etc.

Examples of starting materials within formula II in addition to those set forth in the working examples below are 1-(4-bromobenzyl)-3,5-dimethyl-4-acetyl pyrazole,
1-(2-methyl-6-hexylbenzyl)-3,5-dimethyl-4-acetyl pyrazole,
1-(3-t-butylbenzyl)-3,5-dimethyl-4-acetyl pyrazole,
1-(2,4-difluorobenzyl)-3,5-dimethyl-4-acetyl pyrazole,
1-(2,4-dimethylbenzyl)-3,5-dimethyl-4-acetyl pyrazole,
1-vinyl-3,5-dimethyl-4-acetyl pyrazole,
1-allyl-3,5-dimethyl-4-acetyl pyrazole,
1-ethinyl-3,5-dimethyl-4-pyrazole,
1-hexin-2-yl-(6)-3,5-dimethyl-4-acetyl pyrazole,
1-propallyl-3,5-dimethyl-4-acetyl pyrazole, 1-(4-chlorobenzyl)-3,5-dimethyl-4-propionyl pyrazole, 1-allyl-3,5-dimethyl-4-butyryl pyrazole.

Examples of starting materials within formula III in addition to those set forth in the working examples below are o - methyl norephedrin, p - methoxy - norephedrin, m-ethoxy-norephedrin, p-hexyl norephedrin, p-hexoxy-norephedrin, p-chloronorephedrin, p-fluoro-norephedrin, p-bromo-norephedrin, o-chloro-norephedrin, p-sec. butyl-norephedrin, m-isopropyl-norephedrin, p - ethyl-norephedrin, p-ethoxy-norephedrin.

The starting materials of formula II for the most part are known. In case they are not known they can be produced for example by reacting a pyrazole of the general formula

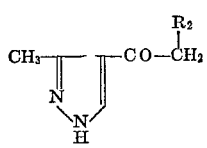

IV with the corresponding halide $R_1X$ where X is chlorine or bromine for example, in the presence of a sodium alcoholate, e.g. sodium methylate, sodium ethylate or sodium isopropylate, in a lower aliphatic alcohol, e.g. methyl alcohol, ethyl alcohol or isopropyl alcohol under reflux. Examples of compounds having the formula $R_1X$ are benzyl chloride, benzyl bromide, 4-chlorobenzyl chloride, 4-bromobenzyl chloride, 4-fluorobenzylchloride, 2,4-dichlorobenzyl chloride, 3,4-dichlorobenzyl chloride, 2,4-difluorobenzyl chloride, 3,4-dimethyl benzyl chloride, 4-methylbenzyl chloride, 2,3-dimethyl benzyl chloride, vinyl chloride, vinyl bromide, allyl chloride, allyl bromide, methallyl chloride, 1-chloro-butine-(2), 1-chloro-butine-(5), cinnamyl chloride, 1-chloro-3-phenyl-propin-(2), 1-chlorohexene-(5).

Illustrative of the production of such a starting material of formula II is the following.

EXAMPLE A 4.6 grams (0.2 mole) of sodium were dissolved in 100 ml. of ethanol and there were added 20.7 grams (0.15 mole) of 3,5-dimethyl-4-acetyl-pyrazole, the solution heated to boiling and a solution of 17.7 grams (0.2 mole) of 1-chloro-butine-(2) in 50 ml. of ethanol was added dropwise. The mixture was heated ½ hour or more, then cooled, filtered, the solvent distilled off and the residue distilled in a vacuum. The 1-[butin-(2)-yl-(4)]-3,5-dimethyl-4-acetyl pyrazole obtained boiled at 176 to 182° C. at 12 mm. Yield: 19 grams.

The other compounds of formula II can be prepared in similar manner by replacing the 1-chlorobutine-(2) by an equal molar amount of any of the other compounds of formula $R_1X$.

The compounds of the invention within formula I which contain asymmetric carbon atoms and as a rule precipitate as racemates can in known ways, for example, by means of optically active acids be split into the optically active isomers. However, it is also possible from the outset to use optically active or diastereomer starting materials whereby there is obtained in the final product a correspondingly pure optically active form or diastereomer configuration.

The conversion of the basic compounds into the acid addition salts takes place according to the usual methods. As acid components for the salts there can be used the customary pharmacologically and physiologically compatible acids, as for example hydrochloric acid, hydrobromic acid, sulfuric acid, acetic acid, citric acid, tartaric acid, maleic acid, fumaric acid, lactic acid, p-toluene sulfonic acid, malonic acid and the like. The free bases can be prepared again from the salts in customary manner, for example by treating with sodium carbonate, soda lye, etc.

The compounds of the invention are suited for the production of pharmaceutical compositions and preparations. The pharmaceutical compositions or medicines contain one or more of the compounds of the invention as active ingredients, in a given case in admixture with other pharmacologically or pharmaceutically active materials. The production of the medicines can be accomplished with the use of known and customary pharmaceutical carriers and diluents as well as formerly customary assistants.

Suitable carriers and assistants are shown for example in Ulmann's "Encyklopädie der Technischen Chemie," vol. 4 (1953), pages 1 to 39; Journal of Pharmaceutical Sciences, vol. 52 (1963), pages 918 and following, H. V. Czetsch-Lindenwald, "Hilfstoffe fur Pharmazie und angrenzende Gebiete," as well as in Pharm. Ind., vol. 2, 1961, page 72 and following. The entire disclosure of these publications are hereby incorporated by reference.

Examples of such carriers and assistants are gelatin, sucrose, pectin, starch, methyl cellulose, talcum, lycopodium, silica, lactose, cellulose derivatives, glucose, fructose, stearates, emulsifiers, plant oils, water, pharmaceutically compatible mono or polyvalent alcohols and polyethylene glycols such as ethyl alcohol, diethyene glycol, polyethylene glycol 400, ethylene glycol, propylene gycol, glycerine, sorbitol, mannitol, pentaerythritol as well as derivatives of such alcohols, dimethyl sulfoxide, esters of aliphatic saturated or unsaturated fatty acids, e.g. stearic acid, palmitic acid or oleic acid with mono or polyvalent alcohols such as glycols, e.g. ethylene glycol, glycerine, diethylene glycol, pentaerythritol, sorbitol, mannitol, etc., which in a given case can be etherified, benzyl benzoate, dioxolane, glycerine formal, glycolfurole, dimethyl acetamide, lactamide, ethyl lactate, ethyl carbonate, etc.

It is also possible to add preservatives, buffers, taste correctives, antioxidants and complex formers (for example, ethylenediaminetetracetic acid) and the like.

As antioxidants there can be used, for example, sodium meta bisulfite and ascorbic acid, as preservatives, for example, sorbic acid, ethyl ester of p-hydroxybenzoic acid and similar materials.

The pharmaceutical preparations generally contain 1 to 50% of the active component of the invention, but as stated above can contain 100% of the active material. If there is no chemical incompatibility there can be added other medically active materials such as, for example, antispasmodics and analgesics.

Dispensing as indicated above can be in the form of tablets, capsules, pills, dragées, plugs, salves, powders, liquids or aerosols. As liquids there can be used oily or aqueous solution or suspensions.

The medicines can be used enterally, parenterally, orally, perlingually or in the form of sprays.

For example, the compounds of the invention show a strong antiphlogistic activity on the inflammation pattern of the rat's paw (carrageenin edema) according to the method of Domenjoz and coworkers (Arch. exp. Pharm. Path. 230 (1957), 325) in oral application at doses of 1 to 500 mg./kg. The best of the compounds of the invention have a 50% edema inhibition at an oral dosage of 3 to 10 mg./kg. The known antiphlogistic salicylamide shows a corresponding activity first at a substantially higher dosage.

The compounds of the invention are indicated as medicines for the following: chronic polyarthritis, illnesses of the rheumatic group, post traumatic inflammations, swellings in fractures, thromophlebitis in any form (also post operative), bursitis, synovitis, collagenosis (polymyositis, periarteritis), and gout.

The heart circulatory activity is shown especially in a widening of the coronary vessels wherein the compounds are effective for example on the Langendorff heart (isolated guinea pig heart) (Langendorff, Pflügers Arch. 61, 291 (1895)), in the dosage range of 10 to 500 μg./heart.

The compounds of the invention can be administered to hosts, e.g. mammals such as humans, dogs, cats, cattle, sheep, rats, mice, etc.

The acute toxicities of the compounds of the invention on the mouse (expressed by the $LD_{50}$ in mg./kg.) by oral application are between 100 and 5000 mg./kg., by intraperitoneal application between 100 and 400 mg./kg. using the test procedure of Miller and Tainter, see Proc. Soc. exper. Biol. a Med. 57, 261 (1944).

In the pharmaceutical uses the individual doses of the active materials of the invention for example can be between 0.1 and 500 mg. depending upon the indicated field and type of application and can be supplied one or more times a day.

Unless otherwise indicated all parts and percentages are by weight.

EXAMPLE 1

1-4-{3-[1-phenyl-1-hydroxypropyl-(2)-amino]propionyl}-1-(4-chlorobenzyl)-3,5-dimethyl pyrazole

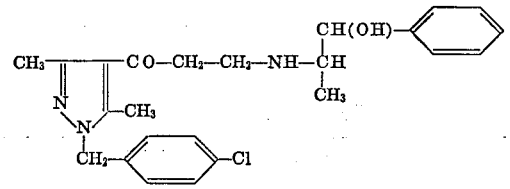

26.2 grams (0.1 mole) of 1-(4-chlorobenzyl)-3,5-dimethyl-4-acetyl pyrazole, 18.7 grams (0.1 mole) of 1-norephedrin. HCl and 3 grams of paraformaldehyde were heated at reflux in 100 ml. of isopropanol for 3 hours, whereby after 1 hour an additional 1.5 grams of paraformaldehyde were added. After treatment of the reaction solution with acetone the HCl salt precipitated out. It was recrystallized from ethyl alcohol. M.P. 195–196° C. Yield 13 grams.

EXAMPLE 2

1-4{3[1-phenyl-1-hydroxypropyl-(2)-amino]propionyl}-1-(2,4-dichlorobenzyl)-3,5-dimethyl pyrazole

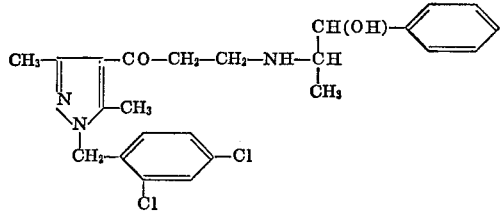

29.7 grams (0.1 mole) of 1-(2,4-dichlorobenzyl)-3,5-dimethyl-4-acetyl pyrazole, 18.7 grams (0.1 mole) of 1-norephedrine. HCl and 3 grams of paraformaldehyde were heated at reflux in 100 ml. of isopropanol for 3 hours, whereby after 1 hour an additional 1.5 grams of paraformaldehyde were added. After the addition of acetone the HCl salt precipitated out of the reaction solution and was recrystallized from ethanol. M.P. 191–192° C. Yield 11 grams.

EXAMPLE 3

1-4-{3-[1-phenyl-1-hydroxypropyl-(2)-amino]propionyl}-1-(3,4-dimethylbenzyl)-3,5-dimethyl pyrazole

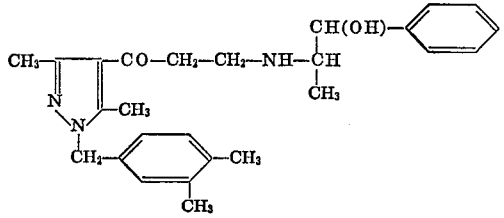

38.4 grams (0.15 mole) of 1-(3,4-dimethylbenzyl)-3,5-dimethyl-4-acetyl pyrazole, 28 grams (0.15 mole) of 1-norephedrine. HCl and 4.5 grams of paraformaldehyde were heated under reflux in 100 ml. of isopropanol for 3 hours, whereby after 1 hour an additional 2.3 grams of paraformaldehyde were added. Upon cooling the reaction solution the HCl salt precipitated out and was recrystallized from methanol, M.P. 199–201° C. Yield 16 grams.

EXAMPLE 4

1-4-{3-[1-phenyl-1-hydroxypropyl-(2)-amino]propionyl}-1-cinnamyl-3,5-dimethyl pyrazole

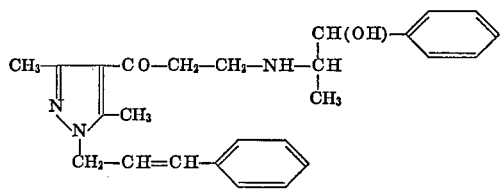

27.9 grams (0.11 mole) of 1-cinnamyl-3,5-dimethyl-4-acetyl pyrazole, 20.6 grams (0.11 mole) of 1-norphedrine. HCl and 3.3 grams of paraformaldehyde were heated at reflux in 100 ml. of isopropanol for 3 hours, whereby after 1 hour an additional 1.5 grams of formaldehyde were added. The solvent was dissolved off and the residue treated with acetone. The HCl salt precipitating thereby was recrystallized from isopropanol. M.P. 174–175° C. Yield 10 grams.

EXAMPLE 5

1-4-{3-[1-phenyl-1-hydroxypropyl-(2)-amino]-propionyl}-1-methallyl-3,5-dimethylpyrazole

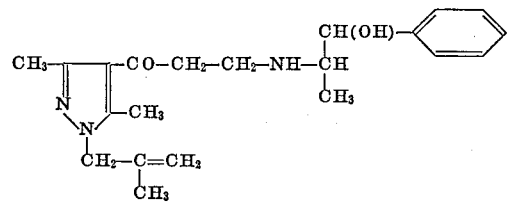

11.5 grams (0.06 mole) of 1-methallyl-3,5-dimethyl-4-acetyl pyrazole, 11.2 grams (0.06 mole) of 1-norephedrine. HCl and 3 grams of paraformaldehyde were heated at reflux in 50 ml. of isopropanol for 3 hours. After addition of acetone the HCl salt precipitated out of the reaction solution and was recrystallized from ethanol M.P. 186–188° C. Yield 8 grams.

EXAMPLE 6

1-4-{3-[1-phenyl-1-hydroxypropyl-(2)-amino]-propionyl}-1-[butin-(2-yl-(4)]-3,5-dimethyl pyrazole

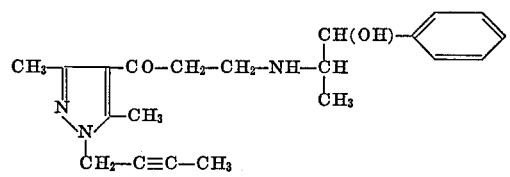

19 grams (0.1 mole) of 1-[butin-(2)-yl-(4)]-3,5-dimethyl-4-acetyl pyrazole, 18.7 grams (0.1 mole) of 1-norephedrine. HCl and 3 grams of paraformaldehyde were heated under reflux in 100 ml. of isopropanol for 4 hours, whereby after 1 hour an additional 1.5 grams of paraformaldehyde were added. The solvent was distilled off and the residue treated with acetone. The HCl salt precipitated thereby was recrystallized in succession from ethanol and methanol. M.P. 194–195° C. Yield 4 grams.

EXAMPLE 7

1-4-{3-[1-phenyl-1-hydroxypropyl-(2)-amino]-propionyl}-1-(4-fluorobenzyl)-3,5-dimethyl pyrazole

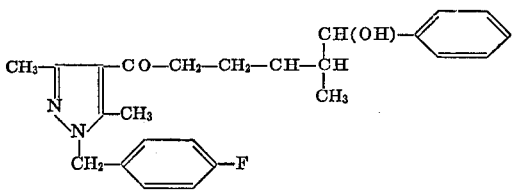

24.6 grams (0.1 mole) of 1-(4-fluorobenzyl)-3,5-dimethyl-4-acetyl pyrazole, 18.7 grams of (0.1 mole) of 1-norephedrine. HCl and 4.5 grams of paraformaldehyde were heated under reflux in 100 ml. of isopropanol for 3 hours. After cooling the HCl salt was precipitated from the reaction solution and recrystallized from ethanol. M.P. 187–189° C. Yield 5 grams.

What is claimed is:
1. A compound having the formula

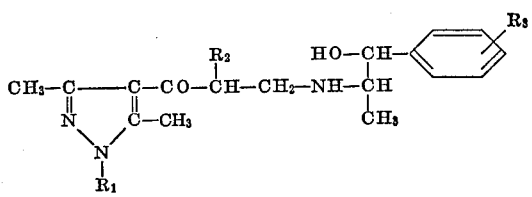

where $R_1$ is (1) alkenyl of 2 to 6 carbon atoms, (2) alkinyl of 2 to 6 carbon atoms, or (3)

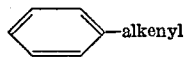

where the alkenyl group has 2 to 6 carbon atoms and wherein the ethylenic unsaturation is between the phenyl group and the pyrazole ring, $R_2$ is hydrogen, methyl or ethyl, $R_3$ is hydrogen, halogen, lower alkyl or lower alkoxy or a pharmacologically acceptable salt of such a compound.

2. A compound according to claim 1 wherein any halogen is chloro or fluoro, and $R_2$ is hydrogen.

3. A compound according to claim 2 wherein $R_3$ is hydrogen.

4. A compound according to claim 2 wherein $R_1$ is alkenyl or alkinyl each of 2 to 4 carbon atoms and $R_3$ is hydrogen or lower alkyl.

5. A compound according to claim 2 wherein $R_1$ is alkenyl of 2 to 4 carbon atoms having a phenyl substituent thereon and $R_3$ is hydrogen or lower alkyl.

6. A compound according to claim 1 wherein $R_3$ is hydrogen, chlorine, fluorine, lower alkyl or lower alkoxy.

7. A compound according to claim 1 wherein $R_1$ is (1) or (3).

8. A compound according to claim 7 wherein any halogen is chloro or fluoro, and $R_2$ is hydrogen.

9. A compound according to claim 8 wherein $R_3$ is hydrogen.

10. A compound according to claim 7 wherein $R_1$ is alkenyl of 2 to 4 carbon atoms and $R_3$ is hydrogen.

11. A compound according to claim 7 wherein $R_3$ is hydrogen, chlorine, fluorine, lower alkyl or lower alkoxy.

References Cited

UNITED STATES PATENTS

| | | | |
|---|---|---|---|
| 3,514,465 | 5/1970 | Posselt et al. | 260—310 A |
| 3,686,206 | 8/1972 | Posselt et al. | 260—310 R |
| 3,651,086 | 3/1972 | Pachter | 260—310 R |

OTHER REFERENCES

Brooklyn et al., J. Chem. Soc. (London), 1968, C, pp. 466–8.
Ciba, Chem. Abst., vol. 64, columns 11226–7 (1966).
Grandberg et al., Chem. Abst., vol. 58, column 9049 (1963).

NATALIE TROUSOF, Primary Examiner

U.S. Cl. X.R.

260—310 R, 311; 424—273